Oct. 24, 1961 E. W. GRANT 3,005,955

DEMODULATORS

Filed June 26, 1958

INVENTOR.
EARL W. GRANT
BY Philip Sublens

ATTORNEY 3,005,955
Patented Oct. 24, 1961

3,005,955
DEMODULATORS

Earl W. Grant, Los Angeles, Calif., assignor to Statham Instruments, Inc., Los Angeles, Calif., a corporation of California Filed June 26, 1958, Ser. No. 744,757
12 Claims. (Cl. 330—10)

This invention relates to a demodulator employing transistors which may be employed to demodulate a modulated carrier frequency.

The objects of my invention will be understood by reference to the drawings, in which—

Figure 1:
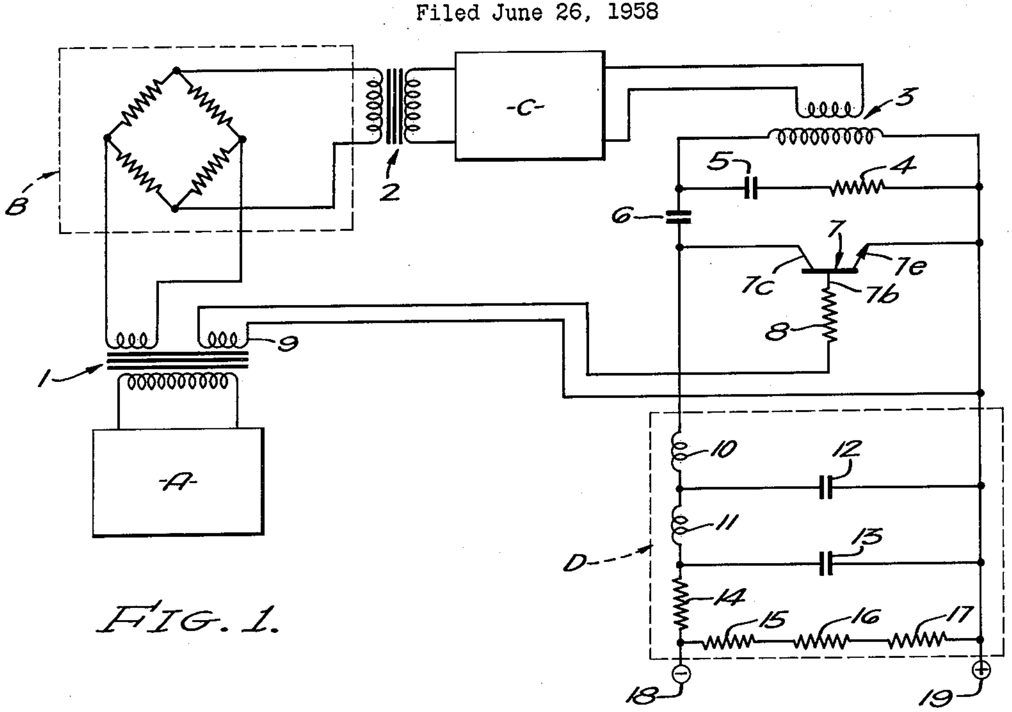
FIG. 1 shows a circuit diagram of the demodulator of my invention.
Figure 2:
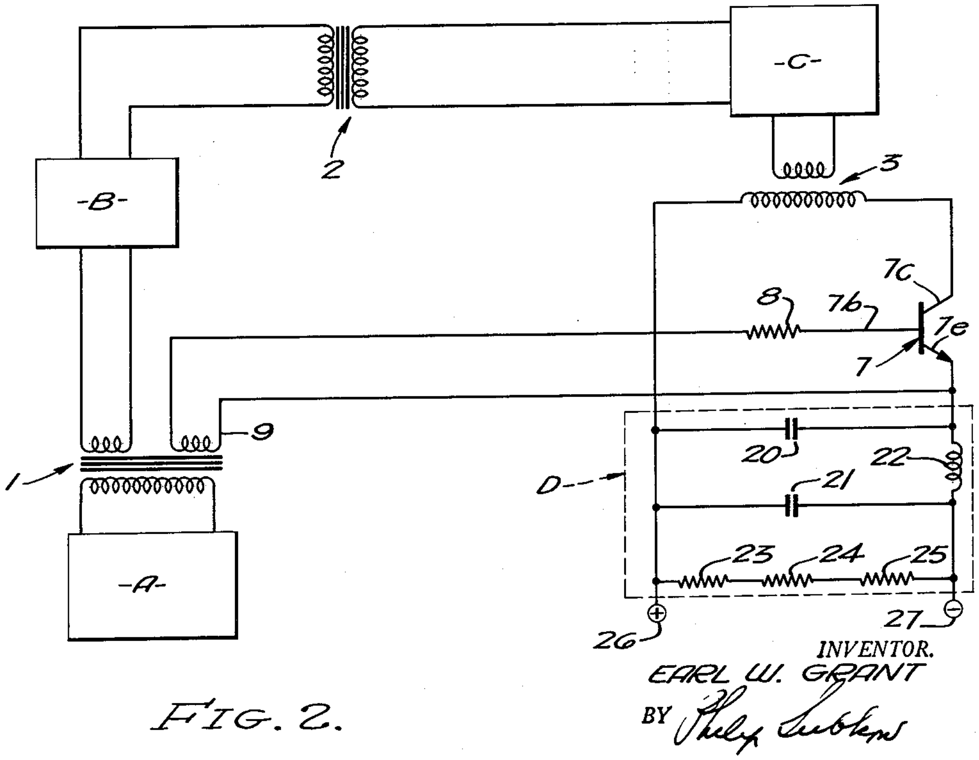
FIG. 2 shows a modified form of the demodulator of my invention.

I have illustrated my invention by showing its employment in a system in which the output of a carrier frequency oscillator is modulated by a bridge circuit such as, for example, that of a four-arm unbonded electrical resistance strain gage. As shown in the drawing, the bridge circuit included in the block diagram B has its input connected to a carrier frequency oscillator illustrated by the block A, which may be of any form. It may be, for example, those illustrated in my companion case, Serial No. 744,759. Instead of using the form of modulator shown in block B, any other form of modulator may be employed. As shown in FIGS. 1 and 2, the output of the oscillator A is inductively coupled at 1 with the input of the modulator B and the output of the modulator is coupled to the input 2 of the amplifier. Since the form of the oscillator forms no part of my invention and the form shown in my companion case, Serial No. 744,759, illustrates but one type of carrier oscillator which may be employed, no further description is necessary.

The output from the bridge illustrated in block B is inductively coupled to the input 2 of the amplifier C. Any form of amplifier may be used, one particularly useful form is shown and claimed in my aforementioned companion case.

In FIG. 1 the output 3 of the amplifier C is inductively coupled to the input of the demodulator of my invention. The input 3 is shunted by an R.C. network composed of the resistance 4 and capacitor 5. A capacitor 6 is provided, connected in series with the network composed of the R.C. network. The base 7*b* of the transistor 7 is connected through resistance 8 to 9 at the output of the carrier frequency oscillator A, which is also connected to emitter 7*e*. The collector 7*c* is connected to one side of the input through the condenser 6 and directly to the other terminal of the input inductance. In the above circuit the transistor 7 shorts during one-half cycle of the square wave generated by the pulse oscillator A. The transistor 7 opens the circuit on the other half of the wave and the stored potential in 6 adds to the voltage across 3 thus causing a voltage amplification.

The output from the demodulator passes through a filter D with M derived section followed by a constant K section, shown schematically in block diagram D, in which 10 and 11 are inductances, 12 and 13 are capacitors, 14, 15, 16 and 17 are resistors and 18 and 19 are the output terminals. The output signal derived from the output terminal of the demodulator is a function of the modulating signal.

The form shown in FIG. 2 is the same as that shown in FIG. 1, except that the demodulator is of a modified form.

Thus the output 3 of C is coupled to the input of the demodulator. The collector electrode 7*c* is in series with the input, as is also the emitter 7*e* of the transistor 7. The output 9 of the carrier frequency oscillator A is connected to the base 7*b* through the resistor 8 and the output is also connected to the emitter electrode 7*e*. A filter D is employed of similar design to that employed in FIG. 1 with two condensers 20 and 21 and intermediate inductance 22 and shunt resistances 23, 24 and 25. The output appears at 26 and 27.

The R.C. net 5 and 4 of FIG. 1 is employed to suppress the transient response when the shunt is removed during the half cycle following that during which the transistor 7 shorts. These transients are the result of current surges which are induced in the inductances 3, 10 and 11, induced when the shunt is removed. In the form of FIG. 2, the current surges do not occur in any significant degree due to the series connection of the inductances 3 and 11 with 7.

All transistors as illustrated are n.p.n. transistors. Transistors of the p.n.p. type may also be employed by suitable rearrangement of polarities as will be understood by those skilled in the art.

While I have described a particular embodiment of my invention for the purpose of illustration, it should be understood that various modifications and adaptations thereof may be made within the spirit of the invention as set forth in the appended claims.

I claim:

1. In a synchronous modulator-demodulator system having means for generating a modulated signal, means for generating a control signal having the frequency of the carrier frequency, a transistor having base, emitter, and collector electrodes coupled to said signal generating means; the improvement comprising means coupling the output of said modulated signal generating means in the emitter collector circuit of said transistor, and means coupling the output of said control signal generating means across the base and emitter of said transistor, and output connections for the demodulated signal coupled to said emitter and said collector.

2. In the system of claim 1, a filter in the output of said demodulator and said first-mentioned means including signal input means and a capacitor in series with said input means and the collector of said transistor, said collector and emitter being coupled across said input means in parallel therewith and with the output of said demodulator.

3. In the system of claim 2, said input means including an inductive coupling means and an R.C. circuit shunting said coupling means.

4. In the system of claim 1, a filter in the output of said demodulator and said first-mentioned means including input means coupled to the collector of said transistor and one of the output terminals of said demodulator and said emitter coupled to the other output terminal of said demodulator, a capacitor coupled across said output terminals in the input section of said filter shunting the said one terminal of the control signal coupling means to said one output terminal.

5. In a synchronous demodulator having a transistor with base, emitter, and collector electrodes, means for coupling a modulated signal to said transistor, and means for coupling a control signal having the frequency of the carrier signal to said transistor; the improvement wherein the first-mentioned means comprises a first portion of the emitter-collector circuit of said transistor, and said second-mentioned means comprises the emitter-base circuit of said transistor, and an output network for said transistor in a second portion of the emitter-collector circuit having output terminals, comprising a filter with an inductive input section and a resistive output section, and wherein one terminal of said control signal coupling means, and one side of said filter are both shunted to one output terminal of said demodulator circuit.

6. In combination with the synchronous demodulator of claim 5, means for generating said modulated signal and a control signal of the same frequency.

7. In the demodulator of claim 5, said first-mentioned means including signal input means and a capacitor in series with said input means and the collector of said transistor, said collector and emitter being coupled across said input means in parallel therewith and with the output of said demodulator.

8. In combination with the synchronous demodulator of claim 7, means for generating said modulated signal and a control signal of the same frequency.

9. In the demodulator of claim 7, said input means including an inductive coupling means and an RC circuit shunting said coupling means.

10. In combination with the demodulator of claim 9, means for generating said modulated signal and a control signal of the same frequency.

11. In the demodulator of claim 5, said first-mentioned means including input means coupled to the collector of said transistor and one of the output terminals of said demodulator and said emitter coupled to the other output terminal of said demodulator, a capacitor coupled across said output terminals in the input section of said filter shunting the said one terminal of the control signal coupling means to said one output terminal.

12. In combination with the demodulator of claim 11, means for generating said modulated signal and a control signal of the same frequency.

References Cited in the file of this patent

UNITED STATES PATENTS

| | | |
|---|---|---|
| 2,072,278 | Schade | Mar. 2, 1937 |
| 2,780,725 | Johanson | Feb. 5, 1957 |
| 2,780,778 | Root et al. | Feb. 5, 1957 |
| 2,795,762 | Sziklai | June 11, 1957 |
| 2,827,611 | Beck | Mar. 18, 1958 |
| 2,884,545 | Houck | Apr. 28, 1959 |
| 2,890,418 | Zawels | June 9, 1959 |
| 2,937,342 | Wellman | May 17, 1960 |
| 2,953,738 | Bright | Sept. 20, 1960 |